(12) United States Patent
Sekizawa et al.

(10) Patent No.: US 10,726,714 B2
(45) Date of Patent: Jul. 28, 2020

(54) WHEEL POSITION DETECTING DEVICE

(71) Applicant: DENSO CORPORATION, Kariya, Aichi-pref. (JP)

(72) Inventors: Takatoshi Sekizawa, Kariya (JP); Ryosuke Kanbayashi, Kariya (JP); Masashi Mori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 8 days.

(21) Appl. No.: 16/317,052

(22) PCT Filed: Jun. 23, 2017

(86) PCT No.: PCT/JP2017/023195
§ 371 (c)(1),
(2) Date: Jan. 11, 2019

(87) PCT Pub. No.: WO2018/012251
PCT Pub. Date: Jan. 18, 2018

(65) Prior Publication Data
US 2019/0279497 A1   Sep. 12, 2019

(30) Foreign Application Priority Data

Jul. 13, 2016  (JP) .................. 2016-138654
Jun. 5, 2017   (JP) .................. 2017-110684

(51) Int. Cl.
*G08C 17/00*   (2006.01)
*B60C 23/00*   (2006.01)
*B60C 23/04*   (2006.01)

(52) U.S. Cl.
CPC ............ *G08C 17/00* (2013.01); *B60C 23/001* (2013.01); *B60C 23/04* (2013.01)

(58) Field of Classification Search
CPC combination set(s) only.
See application file for complete search history.

(56) References Cited

U.S. PATENT DOCUMENTS 5,602,524 A   2/1997  Mock et al.
6,204,758 B1  3/2001  Wacker et al.
(Continued)

FOREIGN PATENT DOCUMENTS

JP      3212311 B2      9/2001
JP      2004331011 A    11/2004
WO      WO-2017159012 A1  9/2017

OTHER PUBLICATIONS

U.S. Appl. No. 16/313,069, filed Dec. 24, 2018, Mori et al.
(Continued)

*Primary Examiner* — Travis R Hunnings
(74) *Attorney, Agent, or Firm* — Harness, Dickey & Pierce, P.L.C.

(57) ABSTRACT

In a tire-mounted sensor attached to a tire, the rotation direction of which is predetermined with respect to the direction of forward movement, a left/right determination as to which of a right wheel or a left wheel has the tire-mounted sensor attached thereto is made on the basis of a detection signal of an acceleration sensor. The result of left/right determination is transmitted to a receiver. In this way, without requesting an operator's manual operation or equipment for bidirectional communication, which of the right wheel or the left wheel has the tire-mounted sensor attached thereto can be determined.

6 Claims, 8 Drawing Sheets

(56) References Cited

U.S. PATENT DOCUMENTS

| | | | | |
|---|---|---|---|---|
| 2003/0048178 A1* | 3/2003 | Bonardi | ............. | B60C 23/0416 340/442 |
| 2008/0211650 A1* | 9/2008 | Nakatani | ............. | B60C 23/0408 340/447 |
| 2013/0207796 A1* | 8/2013 | Stewart | ............. | B60C 23/0416 340/438 |

OTHER PUBLICATIONS

U.S. Appl. No. 16/323,830, filed Feb. 7, 2019, Kanbayashi et al.
U.S. Appl. No. 16/322,166, filed Jan. 31, 2019, Kanbayashi et al.
U.S. Appl. No. 16/324,132, filed Feb. 8, 2019, Kanbayashi et al.

* cited by examiner

WHEEL POSITION DETECTING DEVICE

CROSS REFERENCE TO RELATED APPLICATIONS

This application is a U.S. National Phase Application under 35 U.S.C. 371 of International Application No. PCT/JP2017/023195 filed on Jun. 23, 2017. This application is based on and claims the benefit of priority from Japanese Patent Application No. 2016-138654 filed on Jul. 13, 2016 and Japanese Patent Application No. 2017-110684 filed on Jun. 5, 2017. The entire disclosures of all of the above applications are incorporated herein by reference.

TECHNICAL FIELD

The present disclosure relates to a wheel position detecting device for automatically detecting a position in a vehicle to which a subject wheel is mounted.

BACKGROUND ART

A direct type tire air pressure detecting device is known conventionally. In the direct type air pressure detecting device, a sensor transmitter provided with a pressure sensor and the like is attached to a wheel side at which a tire is mounted. When a detection result of the sensor is transmitted from the sensor transmitter, a vehicle body side system receives the detection result and detects a tire air pressure.

In such a direct type tire air pressure detecting device, it is necessary to specify to which wheel the detection result of the tire air pressure transmitted form the sensor transmitter belongs. For this reason, in the vehicle body side system, a mount position of each wheel, that is, a wheel position indicating at which position of the vehicle the sensor transmitter is attached and individual identification information (hereinafter referred to as ID information) are linked.

For example, this linking is made by a manual operation of an operator by inputting the ID information of each wheel into the vehicle body side system or by bilateral communication between the sensor transmitter and the vehicle body side system by using a trigger device (for example, refer to patent literature 1).

PRIOR ART LITERATURE

Patent Literature

Patent Literature 1: JP 3212311

SUMMARY

However, the linking by the manual operation of the operator necessitates complicated work. Further, the linking by the bilateral communication necessitates equipment for bilateral communication. As a result, it increases the number of components and adds costs.

In case of the wheel position detecting device according to patent literature 1, it is determined to which one of the front, rear, left and right wheels the sensor transmitter is attached by using the trigger device. Even in case of simple determination to which one of the left and right wheels the sensor transmitter is attached, the trigger device is necessitated. For this reason, it is desired to enable at least a determination as to which one of the left and right wheels the sensor transmitter is attached without using the bilateral communication equipment such as the trigger device.

It is therefore an object of the present disclosure to provide a wheel position detecting device, which is capable of specifying to which one of a right wheel and a left wheel a sensor transmitter is attached without necessitating a manual operation of an operator and bilateral communication equipment.

According to one aspect of the present disclosure, a wheel position detecting device is applied to a vehicle having four wheels to which tires are attached and each side surface of which facing an outer side of the vehicle is predetermined. The wheel position detecting device comprises a tire-mounted sensor and a vehicle body side system. The tire-mounted sensor includes a vibration detection unit, a signal processing unit and a transmitter. The vibration detection unit is provided in a back surface of the tire of each of the four wheels and outputs a detection signal corresponding to a magnitude of vibration generated in a tangential direction of the tire. The signal processing unit executes a left/right determination thereby to determine, based on the detection signal of the vibration detection unit in one rotation of the tire, to which one of a right wheel and a left wheel the signal processing unit is attached, and generates wheel position data indicating a determination result of the left/right determination. The transmitter transmits the wheel position data. The vehicle body side system includes a receiver for receiving the wheel position data transmitted from the transmitter and executes a wheel position detection for detecting, based on the wheel position data, to which one of the right wheel and the left wheel the tire-mounted sensor having transmitted the wheel position data is attached.

As described above, the left/right determination for determining to which one of the right wheel and the left wheel the tire-mounted sensor is attached is executed in the tire-mounted sensor based on the detection signal of the vibration unit. Further, by conveying the wheel position data indicating the left/right determination result to the receiver, the wheel position detection for detecting to which one of the right wheel and the left wheel the tire-mounted sensor is attached is executed in the vehicle body side system. It is further possible to execute the left/right determination in the vehicle body side system as well by transmitting the vibration data from the tire-mounted sensor. It is thus possible to specify to which one of the right wheel and the left wheel the tire-mounted sensor is attached without manual operation of an operator and bidirectional communication equipment.

According to another aspect of the present disclosure, a wheel position detecting device is applied to a vehicle having four wheels to which tires are attached and each side surface of which facing an outer side of the vehicle is predetermined. The wheel position detecting device comprises a tire-mounted sensor and a vehicle body side system. The tire-mounted sensor includes a vibration detection unit, a signal processing unit and a transmitter. The vibration detection unit is provided in a back surface of the tire of each of the four wheels and outputs a detection signal corresponding to a magnitude of vibration generated in a tangential direction of the tire. The signal processing unit generates vibration data based on the detection signal of the vibration detection unit in one rotation of the tire. The transmitter transmits the vibration data. The vehicle body side system includes a receiver for receiving the vibration data transmitted from the transmitter and executes wheel position detection by executing a left/right determination for determining, based on the vibration data, to which one of the right wheel and the left wheel the tire-mounted sensor is attached.

It is thus further possible to execute the left/right determination in the vehicle body side system as well by transmitting the vibration data from the tire-mounted sensor. It is thus possible to specify to which one of the right wheel and the left wheel the tire-mounted sensor is attached without manual operation of an operator and bidirectional communication equipment.

EMBODIMENT

Embodiments of the present disclosure will be described below with reference to the drawings. In each embodiment described below, same or equivalent parts are designated with the same reference numerals.

First Embodiment

A road surface condition estimation device 100, which includes a wheel position detecting device according to the present embodiment, will be described with reference to FIG. 1 to FIG. 7. The road surface condition estimation device 100 according to the present embodiment detects a wheel position and estimates a road surface condition, on which a vehicle travels, based on vibrations applied to a ground contact surface of a tire attached to each wheel of the vehicle.

Figure 1:
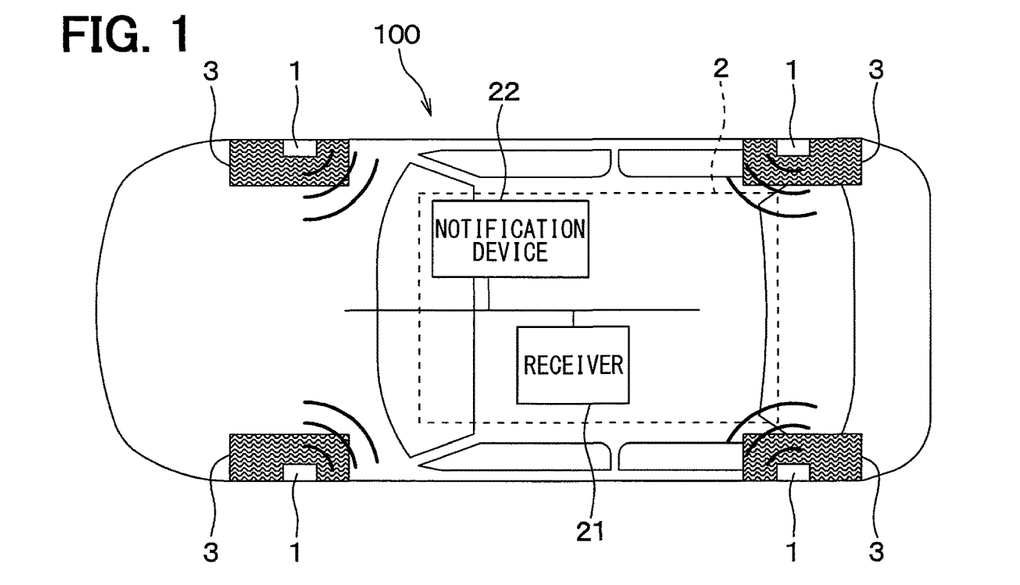
FIG. 1 is a view showing a block configuration of a road surface detecting device which includes a wheel position detecting device according to a first embodiment.
Figure 2:
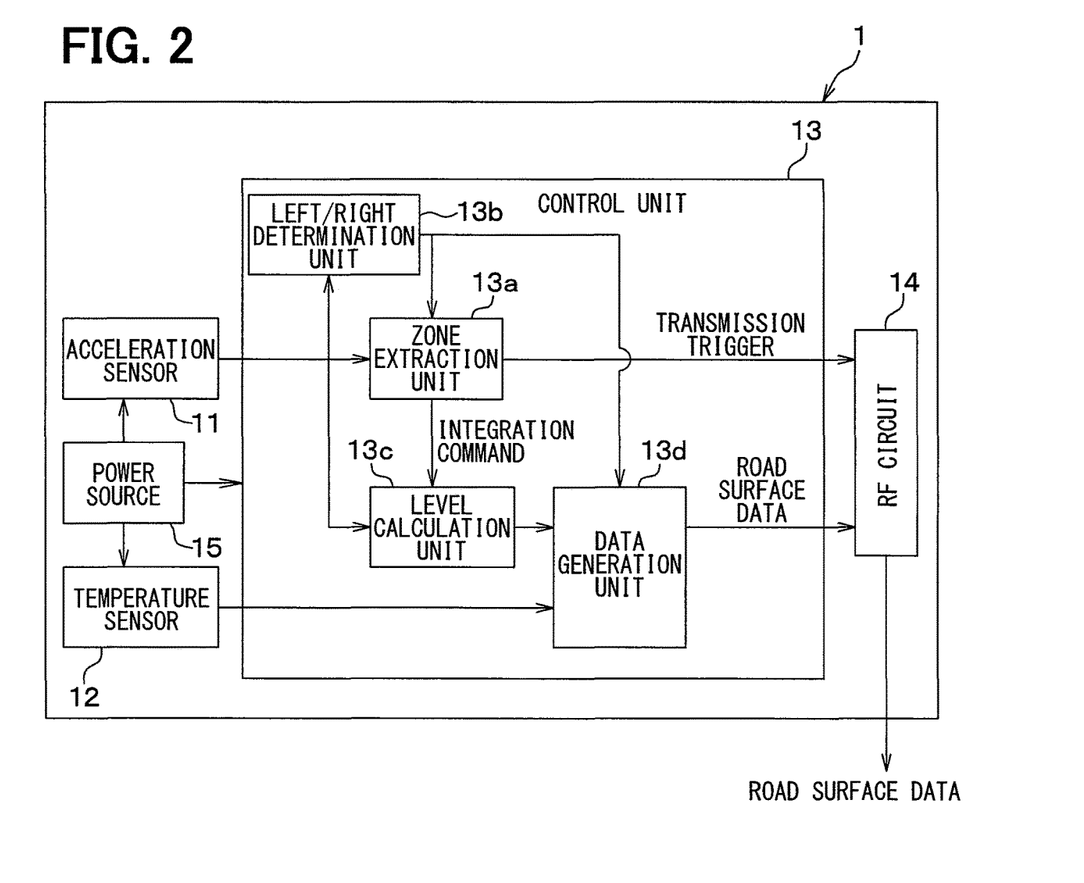
FIG. 2 is a block diagram of a tire-mounted sensor.

As shown in FIG. 1 and FIG. 2, the road surface condition estimation device 100 is configured to have a tire-mounted sensor 1 attached to a wheel side and a vehicle body side system 2, which includes various units provided in a vehicle body side. The vehicle body side system 2 includes a receiver 21, a notification device 22 and the like.

The road surface condition estimation device 100 transmits data, which indicate a road surface condition such as data indicating a road surface μ between the tire 3 and a travel road from the tire-mounted sensor 1. Hereinafter, the road surface μ is referred to as μ data and the data indicating the road surface condition is referred to as road surface data.

The road surface condition estimation device 100 receives by the receiver 21 the road surface data transmitted from the tire-mounted sensor 1 and conveys the road surface condition indicated by the road surface data by the notification device 22. It is thus possible to notify the driver of the road surface condition, for example, the road surface μ is low, a wet road or frozen road and warn the driver when the road surface is slippery.

In this case, when the receiver 21 receives the road surface data transmitted from the tire-mounted sensor 1, it is necessary to recognize to which one of tires 3 the data belongs. For this reason, the road surface condition estimation device 100 executes the wheel position detection based on the road surface data. A part of the road surface condition estimation device 100, which executes the wheel position detection, operates as the wheel position detecting device.

In detail, the tire-mounted sensor 1 and the receiver 21 are formed as described below.

Figure 3:
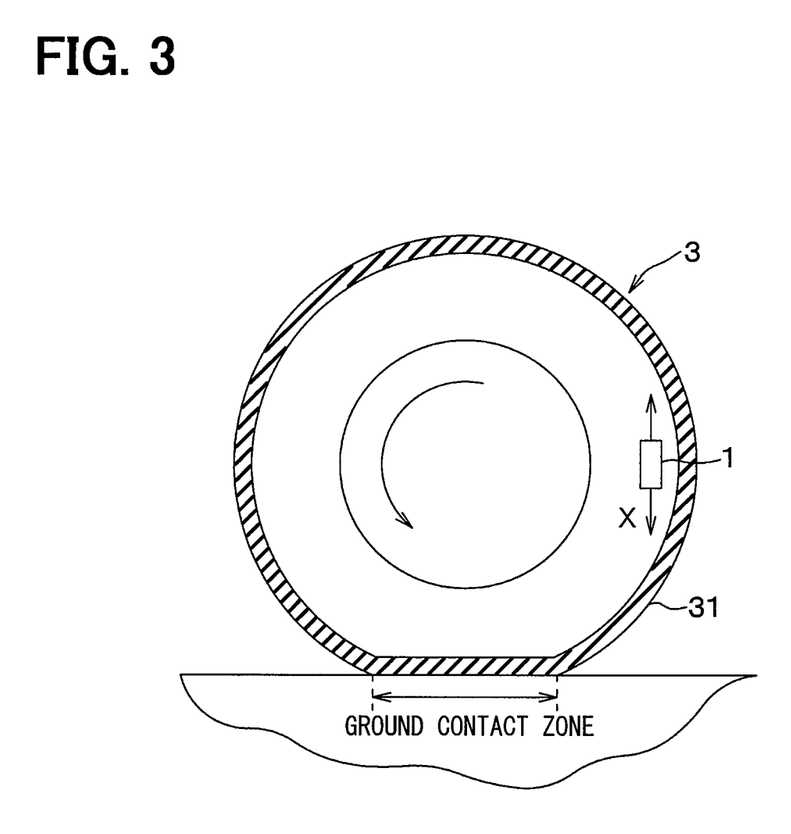
FIG. 3 is a sectional schematic view of a tire to which the tire-mounted sensor is attached.

The tire-mounted sensor 1 is a tire-side device provided at a tire side. As shown in FIG. 2, the tire-mounted sensor 1 is configured to include an acceleration sensor 11, a temperature sensor 12, a control unit 13, an RF circuit 14 and a power source 15. As shown in FIG. 3, the tire-mounted sensor 1 is provided on a back surface side of a tread 31 of the tire 3.

The acceleration sensor 11 is configured as a vibration detection unit for detecting vibrations applied to a tire. For example, the acceleration sensor 11 outputs an acceleration detection signal as a detection signal corresponding to vibrations in a tire-tangential direction indicated with an arrow X in FIG. 3, that is, a direction tangential to a circular orbit which the tire-mounted sensor 1 depicts when the tire 3 rotates. For more details, the acceleration sensor 11 generates as the detection signal an output voltage, which is positive in one direction and negative in the opposite direction, between two directions indicated with the arrow X.

The temperature sensor 12 outputs a detection signal corresponding to temperature. The temperature sensor 12 measures a temperature of the travel road surface by detecting a temperature of a position in the tire 3 at which the tire-mounted sensor 1 is attached.

The control unit 13 corresponds to a signal processing unit. The control unit 13 operates to generate road surface data by using the detection signal of the acceleration sensor 11 as a detection signal, which indicates the vibration data in the tire-tangential direction, and processing this detection signal, and conveys the road surface data to the RF circuit 14. Specifically, the control unit 13 extracts a ground-contact zone of the acceleration sensor 11 during rotation of the tire 3 based on the detection signal of the acceleration sensor 11, that is, a time change of the output voltage of the acceleration sensor 11. The ground-contact zone means an area of a part of the tread 31 of the tire 3, which corresponds to the location of attachment of the acceleration sensor 11 and contacting the road surface. In the present embodiment, since the location of arrangement of the acceleration sensor 11 is the location of arrangement of the vehicle-mounted sensor 1, the ground-contact zone is the same as the area of a portion of the tread 31 of the tire 3, which corresponds to the location of arrangement of the tire-mounted sensor 1 and is in contact with the road surface.

Since high frequency components included in the detection signal of the acceleration sensor 11 generated during an interval of the ground contact zone indicate the road surface condition, the control unit 13 extracts the high frequency components from the detection signal and estimates the road surface condition such as the road surface µ based on the extracted high frequency components as described later.

Further, in the present embodiment, since the temperature of the travel road surface is measured by the temperature sensor 12, the control unit 13 estimates the road surface condition and corrects the road surface condition determined from the high frequency components of the detection signal of the acceleration sensor 11 based on the temperature of the travel road surface.

The control unit 13, thus estimating the road surface condition, generates the road surface data indicating the road surface condition and executes processing of conveying it to the RF circuit 14. The road surface data is thus conveyed to the receiver 21 through the RF circuit 14.

Further, the control unit 13 executes the wheel position detection at a predetermined timing to determine to which wheel the tire-mounted sensor 1 is attached. For example, a tire exchange or a tire rotation may be made possibly during a vehicle stop period. For this reason, it is preferred to execute the wheel position detection in case that the vehicle stop state continues for a predetermined period after stopping of the vehicle. Since the stopping of the vehicle is detectable based on the change in the detection signal of the acceleration sensor 11, the control unit 13 is configured to execute the wheel position detection upon detection that the vehicle starts travelling again after a lapse of the predetermined period from stopping of the vehicle.

For example, in some cases, a rotation direction of the tire 3 is determined in the forward direction like a case that a notation of outside is provided on one side surface of the tire 3. That is, in some cases, one of two side surfaces of the tire 3 is specifically determined to appear on the outer side. In case that the side surface of the tire 3 is specifically determined to appear on the outer side, it is assumed that the direction of rotation of the tire 3 attached to the right wheel in a forward direction is a positive rotation direction, for example. In this case, the direction of rotation of the tire 3 attached to the left wheel in the forward direction is a negative rotation direction, which is opposite to the positive rotation direction. That is, the direction of rotation of the tire 3 is determined such that, assuming that the tire 3 is viewed from the outer side, the tire 3 attached to the right wheel rotates in the clockwise direction and the tire 3 attached to the left wheel rotates in the counter-clockwise direction when the vehicle travels in the forward direction.

In such a case as exemplified above, the detection signal of the acceleration sensor 11 varies depending on to which one of the right wheel and the left wheel the tire-mounted sensor 1 is attached. For example, when the vehicle travels in the forward direction, the tire 3 attached to the right wheel is rotated in the positive rotation direction and the tire 3 attached to the left wheel is rotated in the negative rotation direction. The acceleration sensors 11 attached to the left wheel and the right wheel generate respective output voltages which are of opposite polarities.

For this reason, the control unit 13 detects to which one of the right wheel and the left wheel the tire-mounted sensor 1 is attached based on the detection signal of the acceleration sensor 11. The control unit 13 thus sends the wheel position data, which indicates that the wheel to which the tire-mounted sensor 1 is attached is the right wheel or the left wheel, to the RF circuit 14 together with the road surface data or separate data differently from the road surface data. The wheel position data is sent to the receiver 21 through the RF circuit 14.

Specifically, the control unit 13 is formed of a conventional microcomputer including a CPU, a ROM, a RAM, an I/O and the like and executes the processing described above based on a program stored in the ROM or the like. The control unit 13 includes, as functional units for executing such processing, a zone extraction unit 13*a*, a left/right determination unit 13*b*, a level calculation unit 13*c*, and a data generation unit 13*d*.

Figure 4A:
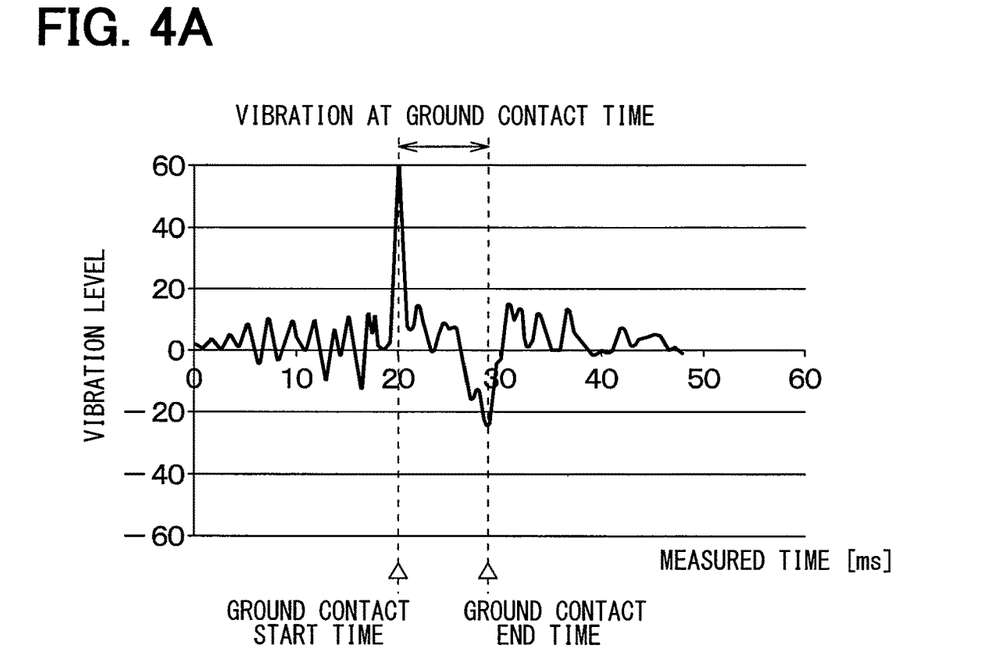
FIG. 4A is a chart showing a change in an output voltage of an acceleration sensor at tire rotation time regarding a tire-mounted sensor attached to a right wheel.
Figure 4B:
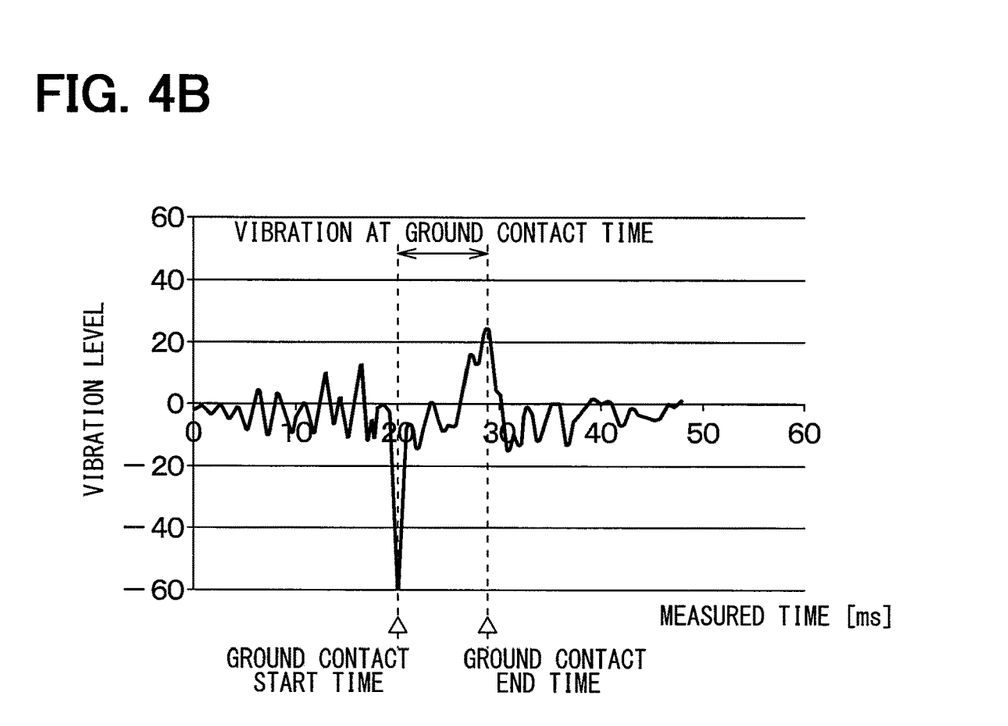
FIG. 4B is a chart showing a change in an output voltage of an acceleration sensor at tire rotation time regarding a tire-mounted sensor attached to a left wheel.

The zone extraction unit 13*a* extracts the ground contact zone by detecting a peak value of the detection signal indicated by the output voltage of the acceleration sensor 11. The output voltage waveform of the acceleration sensor 11 during rotation changes as shown in FIG. 4A and FIG. 4B in case that the tire-mounted sensor 1 is attached to the right wheel and the tire-mounted sensor 1 is attached to the left wheel, respectively, for example. The ground contact zone is extracted from these waveforms. In the following description, for simplification of description, it is assumed that the tire-mounted sensor 1 is attached to the right wheel.

As shown in FIG. 4A, at a ground contact start time at which the part of the tread 31 corresponding to the location of arrangement of the acceleration sensor 11 starts contacting the ground during the rotation of the tire 3, the output voltage of the acceleration sensor 11 takes a maximum value. The zone extraction unit 13*a* detects the ground contact start time, at which the output voltage of the acceleration sensor 11 takes the maximum value, as a first peak value timing. Further, as shown in FIG. 4A, at a ground contact end time at which the part of the tread 31 corresponding to the location of arrangement of the acceleration sensor 11 ends contacting the ground during rotation of the tire 3, the output voltage of the acceleration sensor 11 takes a minimum value. The zone extraction unit 13*a* detects the ground contact end time at which the output voltage of the acceleration sensor 11 takes the minimum value as a second peak value timing.

The output voltage of the acceleration sensor 11 takes the peak values at the above-described timings for the following reasons. When the part of the tread 31 corresponding to the location of arrangement of the acceleration sensor 11 comes to contact the ground during rotation of the tire 3, the part of the tire 3 having been in generally cylindrical shape near the acceleration sensor 11 is pressed and deformed in a planar shape. Receiving shock at this time, the output voltage of the acceleration sensor 11 takes the first peak value. When the part of the tread 31 corresponding to the location of arrangement of the acceleration sensor 11 leaves the ground surface during rotation of the tire 3, the part of the tire 3 is released from pressurization and restores to the generally cylindrical shape from the planar shape. Receiving shock at the time of restoring the original shape of the tire 3, the output voltage of the acceleration sensor 11 takes the second peak value. As described above, the output voltage of the acceleration sensor 11 takes the first peak value and the second peak value at the ground contact start time and the ground contact end time, respectively. Since a direction of shock at the time when the tire 3 is pressed and a direction of shock at the time when the tire 3 is released from pressurization are opposite, polarities of the output voltages are also opposite.

The zone extraction unit 13a extracts the ground contact zone of the acceleration sensor 11 by extracting the data of the detection signal including the timings of the first peak value and the second peak value and conveys that it is within the ground contact zone to the level calculation unit 13c.

Since the output voltage of the acceleration sensor 11 takes the second peak value at the ground contact end time of the acceleration sensor 11, the zone extraction unit 13a transmits the transmission trigger to the RF circuit 14 at this timing. Thus the road data such as the μ data generated by the data generation unit as described later is transmitted from the RF circuit 14. Since the data transmission from the RF circuit 14 is not executed always but executed limitedly only at the ground contact end time as described above, it is possible to reduce power consumption. Although the timing, at which the output voltage of the acceleration sensor 11 takes the second peak value, is exemplified as the timing of data transmission from the RF circuit 14, it may be at other timing. Further, the data transmission is not limited to once in every one rotation of the tire 3 but may be once in plural number of rotations or plural number of data transmissions in every one rotation of the tire 3.

Here, it is exemplified that the tire-mounted sensor 1 is attached to the right wheel. However, in case that the tire-mounted sensor 1 is attached to the left wheel, the second peak value appears prior to the first peak value. For this reason, the ground contact zone is extracted as an interval during which the output signal of the acceleration sensor 11 changes from the second peak value to the first peak value. Whether the first peak value should be detected prior to the second peak value or the second peak value should be detected prior to the first peak value is determined based on a determination result of the left/right determination unit 13b described next. In case that the left/right determination unit 13b determines that the tire-mounted sensor 1 is attached to the right wheel, the ground contact zone is extracted by detecting the first peak value in advance of detecting the second peak value. In case that the left/right determination unit 13b determines that the tire-mounted sensor 1 is attached to the left wheel, on the other hand, the ground contact zone is extracted by detecting the second peak value in advance of detecting the first peak value.

With a determination start condition indicating that the vehicle started traveling again after the lapse of the predetermined period from stopping of the vehicle, the left/right determination unit 13b makes a left/right determination to determine to which one of the right wheel and the left wheel the tire-mounted sensor 1 is attached. The start of traveling of the vehicle again after the lapse of the predetermined period from stopping of the vehicle is detected based on a change in the detection signal of the acceleration sensor 11. For example, the left/right determination unit 13b measures the period from time when the detection signal of the acceleration sensor 11 exhibits no change during tire rotation to time when the detection signal exhibits a change again and determines that the determination start condition is satisfied when the measured period exceeds a predetermined threshold value.

As described above, the output voltage waveform of the acceleration sensor 11 varies in accordance with to which one of the right wheel and the left wheel the tire-mounted sensor 1 is attached. That is, in case that the tire-mounted sensor 1 is attached to the right wheel, the first peak value appears before the second peak value appears in the output voltage waveform as shown in FIG. 4A. Further, in case that the tire-mounted sensor 1 is attached to the left wheel, the second peak value appears before the first peak value appears in the output voltage waveform as shown in FIG. 4B. Still further, the interval corresponding to the ground contact zone is shorter than the other interval which does not correspond to the ground contact zone.

For this reason, the left/right determination unit 13b receives the detection signal of the acceleration sensor 11 and determines that a shorter one of an interval from the first peak value to the second peak value and an interval from the second peak value to the first peak value corresponds to the ground contact zone. The left/right determination unit 13b thus determines to which one of the right wheel and the left wheel the tire-mounted sensor 1 is attached based on whether the start of the ground contact zone is the first peak value or the second peak value. That is, the left/right determination unit 13b determines that the tire-mounted sensor 1 is attached to the right wheel when the ground contact zone starts with the first peak value and that the tire-mounted sensor 1 is attached to the left wheel when the ground contact zone starts with the second peak value.

Further, after determining to which one of the right wheel and the left wheel the tire-mounted sensor 1 is attached, the left/right determination unit 13b sends the determination result to the zone extraction unit 13a and the data generation unit 13d. The condition for ending the left/right determination executed by the left/right determination unit 13b may be set arbitrarily. For example, the end condition may be set to a predetermined rotation of the tire 3 or a next stop of the vehicle.

When it is conveyed from the zone extraction unit 13a that it is within the ground contact zone, the level calculation unit 13c calculates a level of the high frequency components, which arise from vibration of the tire 3 and is included in the output voltage of the acceleration sensor 11 during the interval of the ground contact zone. The level calculation unit 13c conveys such a calculation result to the data generation unit 13d as the road surface data such as the μ data. The level of the high frequency components is calculated as an index indicating the road surface condition such as the road surface μ for the following reasons described below with reference to FIG. 5A, FIG. 5B and FIG. 6.

Figure 5A:
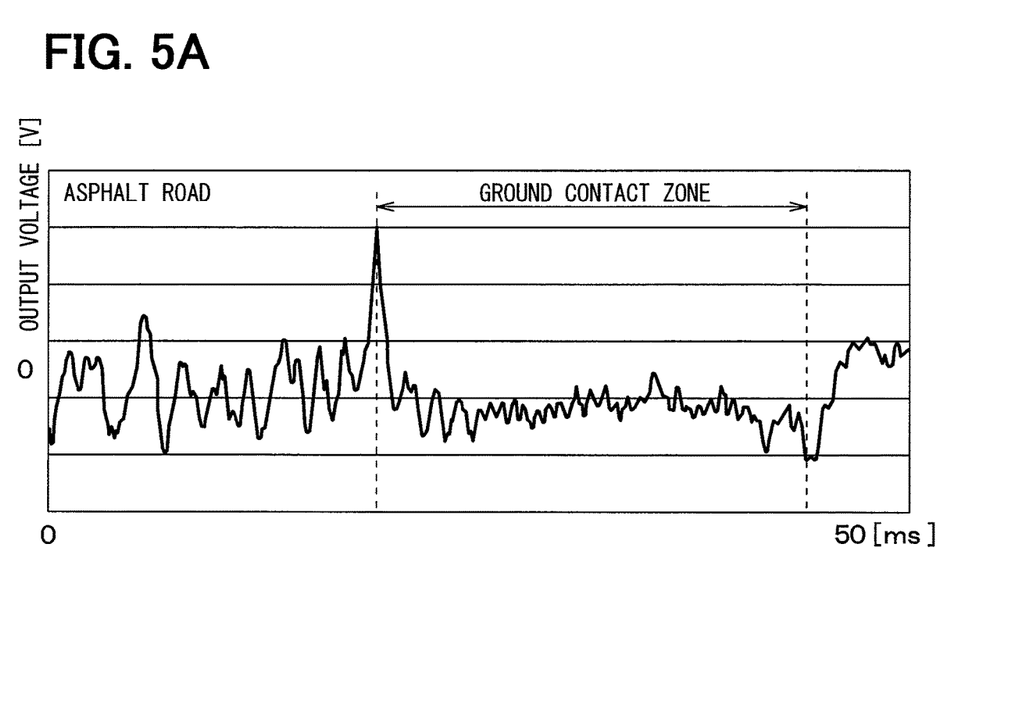
FIG. 5A is a chart showing a change in the output voltage of the acceleration sensor in case of traveling on a high μ road surface such as an asphalt road, a road surface μ of which is comparatively high.
Figure 5B:
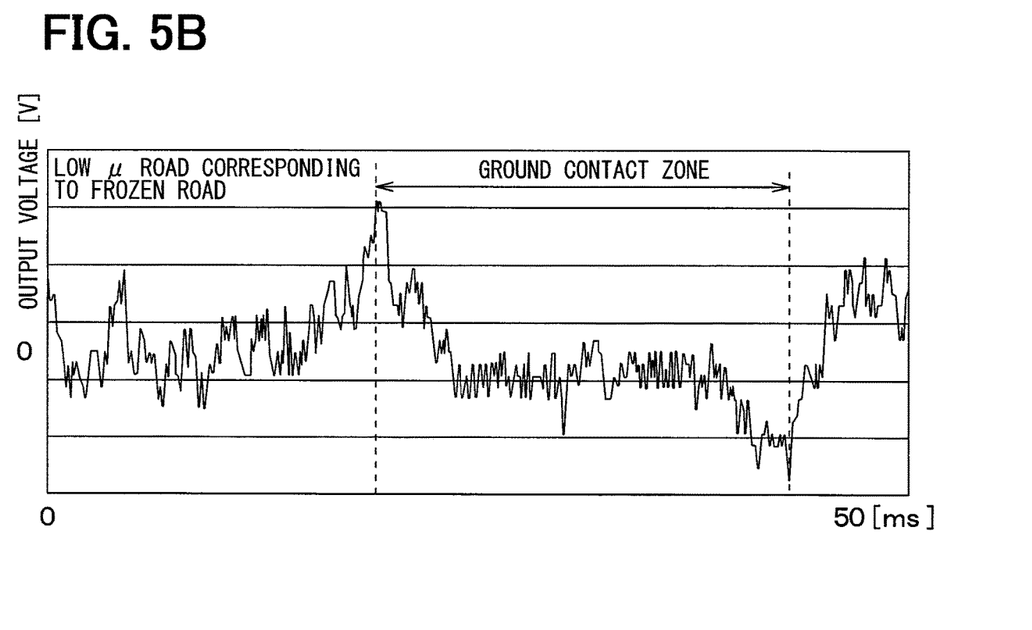
FIG. 5B is a chart showing a change in the output voltage of the acceleration sensor in case of traveling on a low μ road surface such as a frozen road, a road surface μ of which is comparatively low.

FIG. 5A shows a change of the output voltage of the acceleration sensor 11 in case of traveling on the high μ road surface like an asphalt road, the road surface μ of which is comparatively large. FIG. 5B shows a change of the output voltage of the acceleration sensor 11 in case of traveling on the low μ road surface like a road corresponding to a frozen road, the road surface μ of which is comparatively small.

As is evident from those figures, the first peak value and the second peak value appear at the start and the end of the ground contact zone, that is, the ground contact start time and the ground contact end time of the acceleration sensor 11, respectively, regardless of the road surface μ. However, the output voltage of the acceleration sensor 11 changes as affected by the road surface μ. For example, in case that the road surface μ is low like traveling on the low μ road surface, fine high frequency vibration caused by slipping of the tire 3 is superimposed on the output voltage. This fine high frequency noise caused by slipping of the tire 3 is not superimposed in case that the road surface μ is high like traveling on the high μ road surface.

Figure 6:
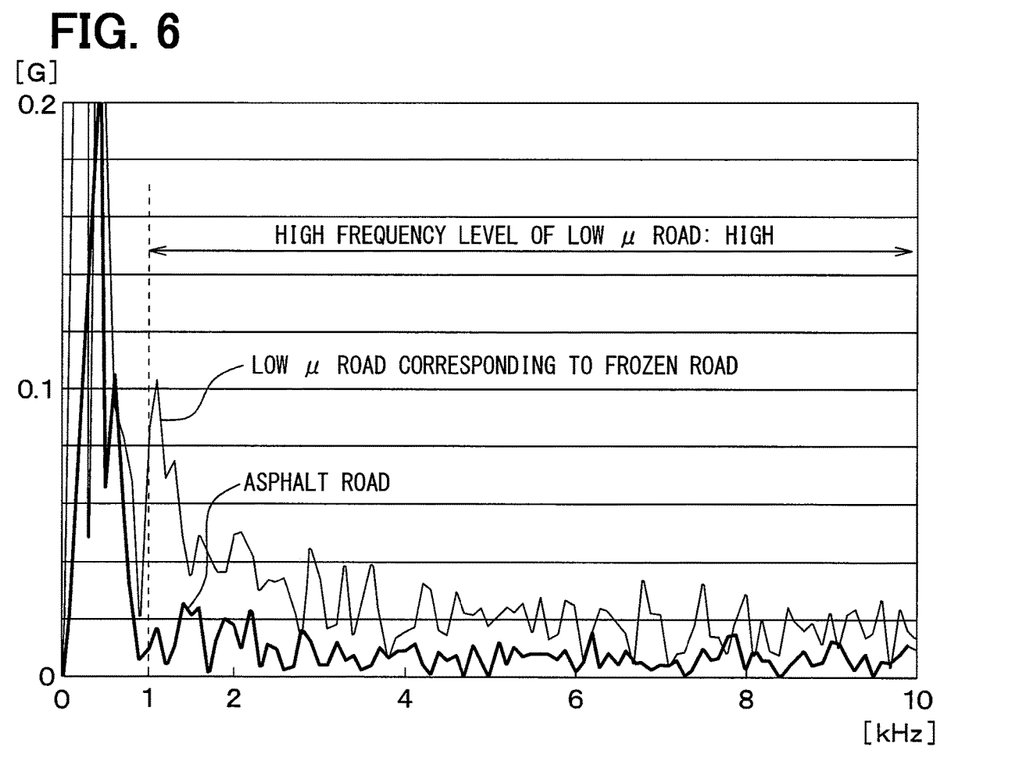
FIG. 6 is a chart showing a result of frequency analysis conducted on the output voltage during a ground contact period with respect to each case of traveling on the high μ road and the low μ road.

For this reason, frequency analysis of the output voltage in the ground contact zone with respect to the high road μ and low road μ produces results shown in FIG. 6. That is, the frequency analysis result indicates a high level in a low frequency band in any cases of traveling the high μ road surface and the low μ road surface. However, in a high frequency band of 1 kHz or more, the level is higher in case of the low road surface μ. For this reason, the level of the high frequency components of the output voltage of the acceleration sensor 11 is the index indicating the road surface condition.

Therefore, by calculating the level of the high frequency components of the output voltage of the acceleration sensor 11 in the ground contact zone by the level calculation unit 13*c*, it is possible to use the calculated level as μ data. Further, it is also possible to detect a type of the road surface corresponding to the road surface μ as the road surface condition. For example, it is possible to determine the frozen road when the road surface μ is low.

For example, the high frequency component level is calculated by extracting the high frequency components from the output voltage of the acceleration sensor 11 and integrating the high frequency components extracted during the interval of the ground contact zone. Specifically, the high frequency components of the frequency band fa to fb, in which it is assumed to change in correspondence to the road surface condition or the road surface μ, are extracted by filtering or the like and a voltage of the high frequency components in the frequency band fa to fb extracted by the frequency analysis. For example, the high frequency components are charged in a capacitor. Thus the charge amount is greater in case that the road surface μ is low like traveling on the low μ road surface than in case that the road surface μ is high like traveling on the high μ road surface. By thus using the charge amount as the μ data, it is possible to estimate that the road surface μ is lower as the charge amount indicated by the μ data is greater.

The data generation unit 13*d* generates the road surface data and the wheel position data indicating the determination result about to which one of the right wheel and the left wheel the tire-mounted sensor 1 is attached. The data generation unit 13*d* thus operates to convey the generated data to the RF circuit 14.

The data generation unit 13*d* basically generates the road surface data based on the calculation result of the level calculation unit 13*c*. For example, the data generation unit 13*d* uses the μ data as it is as the road surface data or generates data as the road surface data by determining the road surface condition like the frozen road or the asphalt road based on the μ data.

Further, as described above, the temperature of the travel road surface is measured by the temperature sensor 12 in the present embodiment. The data generation unit 13*d* acquires the road surface temperature by receiving the detection signal of the temperature sensor 12, detects the type of the road surface based on the acquired road surface temperature and corrects the μ data or the type of the road surface determined based on the μ data.

For example, in case that the road surface temperature detected by the temperature sensor 12 is lower than 0° C. and negative, the data generation unit 13*d* detects that the road surface is in the frozen condition as the type of the road surface condition. Further, in case that the μ data determined from the high frequency components of the detection signal of the acceleration sensor 11 or the type of the road surface indicated by the μ data does not match the road surface temperature detected by the temperature sensor 12, the data generation unit 13*d* corrects it or does not use it as the detection result of the road surface condition. For example, in case that the type of the road surface determined from the high frequency components of the detection signal of the acceleration sensor 11 indicates the frozen condition, the detection result indicating that the type of the road surface is the frozen condition is erroneous if the road surface temperature detected by the temperature sensor 12 is 40° C. In this case, the data generation unit 13*d* does not use the result conveyed from the level calculation unit 13*c* as the detection result of the type of the road surface. Similarly, in case that the road surface μ indicated by the μ data does not match the type of the road surface determined from the road surface temperature, for example, in case that the road surface μ indicated by the μ data is high contrary to the detection that the road surface temperature indicates the frozen condition, the data generation unit 13*d* corrects the road surface μ indicated by the μ data to a lower value than before the correction.

The data generation unit 13*d* further generates the wheel position data indicating the determination result conveyed from the left/right determination unit 13*b*. The wheel position data is stored in a transmission frame together with the road surface data or separately from the road surface data and sent to the RF circuit 14.

The RF circuit 14 forms a transmission unit, which transmits the road surface data such as the μ data and the wheel position data conveyed from the data generation unit 13*d* to the receiver 21. The communication between the RF circuit 14 and the receiver 21 may be executed by conventional short-range radio communication technology like Bluetooth (registered trademark). Although the road surface data may be transmitted at arbitrary timing, the road surface data is transmitted from the RF circuit 14 in response to the transmission trigger sent from the zone extraction unit 13*a* at the ground contact end time of the acceleration sensor 11 in the present embodiment as described above. Since the data transmission by the RF circuit 14 is executed not continuously but limitedly at the ground contact time of the acceleration sensor 11, it is possible to reduce power consumption. In case that the wheel position data is stored in the same frame together with the road surface data, the wheel position data is transmitted from the RF circuit 14 at the same time as the time of transmission of the road surface data. Further, in case that the wheel position data is stored in a different frame separately from the road surface data, the wheel position data may be transmitted at the same time as or at different time from the transmission of the road surface data.

The road surface data and the wheel position data are transmitted together with an individual identification information (hereinafter referred to as ID information), which is predetermined to each wheel of the tire 3 of the vehicle. Since the position of each wheel is specifiable by the right/left determination result indicated by the wheel position data and a front/rear determination result described later, it is possible to link the wheel position data with the wheel by conveying road surface data and wheel position data to the receiver 21 together with the ID information.

The power source 15 is formed of a battery, for example, and supplies power to drive each section of the tire-mounted sensor 1.

The receiver 21 receives the wheel position data transmitted from the tire-mounted sensor 1 and determines, based on the received wheel position data, to which one of the right wheel and the left wheel the tire-mounted sensor 1 having executed the data transmission is attached. Further, the receiver 21 executes the front/rear determination, to which one of the front wheel and the rear wheel the tire-mounted sensor 1 having executed the data transmission is attached, based on other methods. This front/rear determination may be executed by any one of conventional methods. Here, as one example of the front/rear determination by the vehicle body side system 2, the receiver 21 is exemplified to execute the front/rear determination. However, the front/rear determination is not limited to be executed by the receiver 21 but may be executed by any units of the vehicle body side system 2.

For example, by differently setting distances from the front wheel and the rear wheel to the receiver 21, it is determined to which one of the front wheel and the rear wheel the tire-mounted sensor 1 having executed the data transmission is attached based on a strength of received signal when the wheel position data or the road surface data is received. The strength of electric wave attenuates more as the distance becomes longer. For this reason, in case that the receiver 21 is located closer to the front wheel, the strength of signal received from the tire-mounted sensor 1 attached to the front wheel is larger than that received from the tire-mounted sensor 1 attached to the rear wheel. For this reason, when data are received from the tire-mounted sensors 1 of four wheels, the strengths of the received signals are compared. Thus, between the tire-mounted sensors 1 attached to the right wheels, the strength of the received signal from the front wheel is higher than that from the rear wheel. Similarly, between the tire-mounted sensors 1 attached to the left wheels, the strength of the received signal from the front wheel is higher than that from the rear wheel. Based on these results of the front/rear determination and the left/right determination indicated by the wheel position data, it is possible to specify one of four wheels to which the tire-mounted sensor 1 is attached and completes the wheel position detection.

Further, the receiver 21 receives the road surface data and estimates the road surface condition based on the received data with respect to each wheel. At this time, the wheel position detection is executed as described above. Since it is possible to specify from which one of the tire-mounted sensors 1 of the wheels the road surface data is transmitted, the road surface condition is easily estimated with respect to each wheel. The estimated road surface condition is conveyed to the notification device 22 and, when necessary, the road surface condition is conveyed to a driver from the notification device 22. Thus the driver tries to be mindful of driving the vehicle in correspondence to the road surface condition thereby to avoid danger of the vehicle. For example, the estimated road surface condition may be displayed through the notification device 22 continuously. The estimated road surface condition may alternatively be displayed as a warning to the driver only when the vehicle need be driven more carefully like a case that the estimated road surface corresponds to the wet road, frozen road, low μ road and the like. The estimated road surface condition may be conveyed from the receiver 21 to an electronic control unit (hereinafter referred to as ECU) for brake control, which is one example of ECUs for vehicle motion control, so that the vehicle motion control is executed based on the conveyed road surface condition.

The notification device 22 is configured with a meter display device for example and used to notify the driver of the road surface condition. In case that the notification device 22 is configured with the meter display device, it is located at a position which the driver is capable of recognition during driving of the vehicle, for example, within an instrument panel in the vehicle. The meter display device notifies the driver visually of the road surface condition in a mode enabling recognition of the road surface condition by displaying the road surface condition, when the road surface condition is conveyed from the receiver 21.

The notification device 22 may alternatively be configured with a buzzer or voice guidance device. In such a case, the notification device 22 notifies the driver of the road surface condition audibly by buzzer sound or voice guidance. Although the meter display device is exemplarily referred to as the notification device 22 for providing visual notification, the notification device 22 may be configured with a display device like a head-up display which provides information display.

The wheel position detecting device 100 according to the present embodiment is configured as described above. Each unit forming the vehicle body side system 2 is connected through an in-vehicle LAN (Local Area Network) like CAN (Controller Area Network) communication. Thus each unit is capable of communicating information mutually through the in-vehicle LAN.

Figure 7:
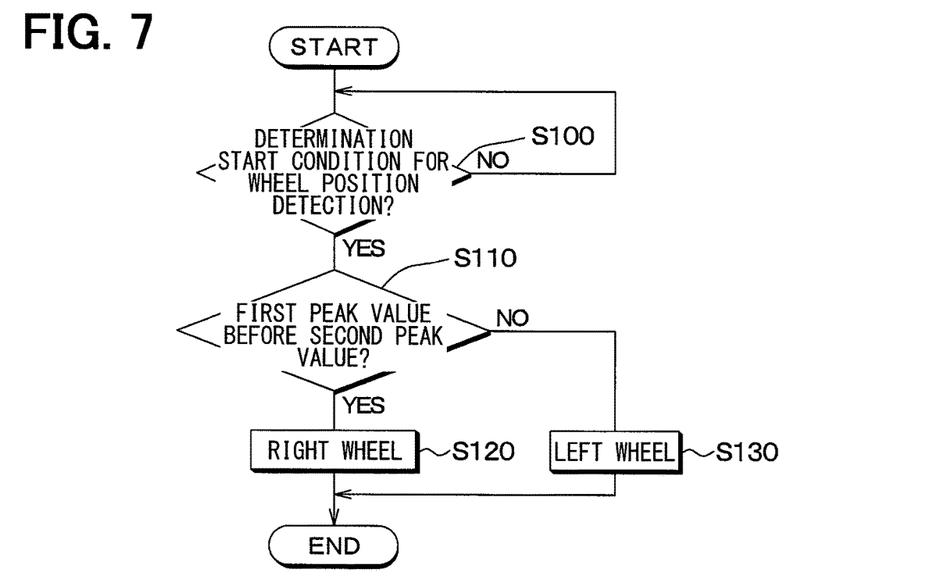
FIG. 7 is a flowchart showing whole processing executed systematically by the tire-mounted sensor.

An operation of the tire-mounted sensor 1 of the wheel position detecting device 100 according to the present embodiment will be described next with reference to FIG. 7. FIG. 7 is a flowchart showing details of the left/right determination processing executed by the left/right determination unit 13b. This processing is executed at every predetermined period.

In the tire-mounted sensor 1 of each wheel, the acceleration sensor 11 executes acceleration detection with power supply from the power source 15 and generates the output voltage corresponding to the vibration applied to the tire 3. By using the detection signal of the acceleration sensor 11, it is determined at step S100 whether a determination start condition for the wheel position detection is satisfied. Specifically, it is determined that the determination start condition is satisfied when a period, which is measured from time of disappearance of a change associated with tire rotation to time of appearance of a next change in the detection signal of the acceleration sensor 11, exceeds a predetermine threshold value. In case of a positive determination, step S110 is executed. In case of a negative determination, the processing of step S100 is repeated.

At step S110, the output voltage of the acceleration sensor 11 is analyzed to determine which one of the first peak value and the second peak value appears in every one rotation of the tire 3. It is determined here whether the first peak valve appears prior to appearance of the second peak value. In case that the first peak value appears prior to the appearance of the second peak value, step S120 is executed to determine that the tire-mounted sensor 1 is attached to the right wheel. In case that the second peak value appears prior to the appearance of the first peak value, step S130 is executed to determine that the tire-mounted sensor 1 is attached to the left wheel. Then, the determination result of the left/right determination, that is, to which one of the right wheel and the left wheel the tire-mounted sensor 1 is attached, is transmitted. The determination result is conveyed to the zone extraction unit 13a and the data generation unit 13d. Thus the zone extraction unit 13a is enabled to extract the ground contact zone by specifying which one of the first peak value and the second peak value appears first. The data generation unit 13d is enabled to convey the wheel position data to the receiver 21 side through the RF circuit 14.

With the wheel position data being thus conveyed to the receiver 21, the wheel position detection is executed in the receiver 21 as described above. Based on the detection result, the road surface condition is estimated when the road surface data is conveyed from the tire-mounted sensor 1.

As described above, in the road surface condition estimation device 100 according to the present embodiment, the tire-mounted sensor 1 executes the left/right determination based on the detection signal to determine to which one of the right wheel and the left wheel the tire-mounted sensor 1 is attached. The left/right determination result is conveyed to the receiver 21. By executing the front/rear determination by the receiver 21, it is specified to which one of the four wheels each tire-mounted sensor 1 is attached. Thus, without manual operation by an operator and without necessitating equipment for bilateral communication, it is possible to specify to which one of the right wheel and the left wheel the tire-mounted sensor 1 is attached. It is also possible to specify to which one of the front wheel and the rear wheel the tire-mounted sensor 1 is attached.

Second Embodiment

A second embodiment of the present disclosure will be described. In the present embodiment, the configuration of the tire-mounted sensor 1 and the method of the wheel position detection are changed from those of the first embodiment. Since other points are the same as the first embodiment, only differences from the first embodiment will be described.

In the first embodiment, the left/right determination and the front/rear determination of the wheel position detection are executed by the tire-mounted sensor 1 and the receiver 21, respectively. In the present embodiment, both of the left/right determination and the front/rear determination are executed by the tire-mounted sensor 1.

Figure 8:
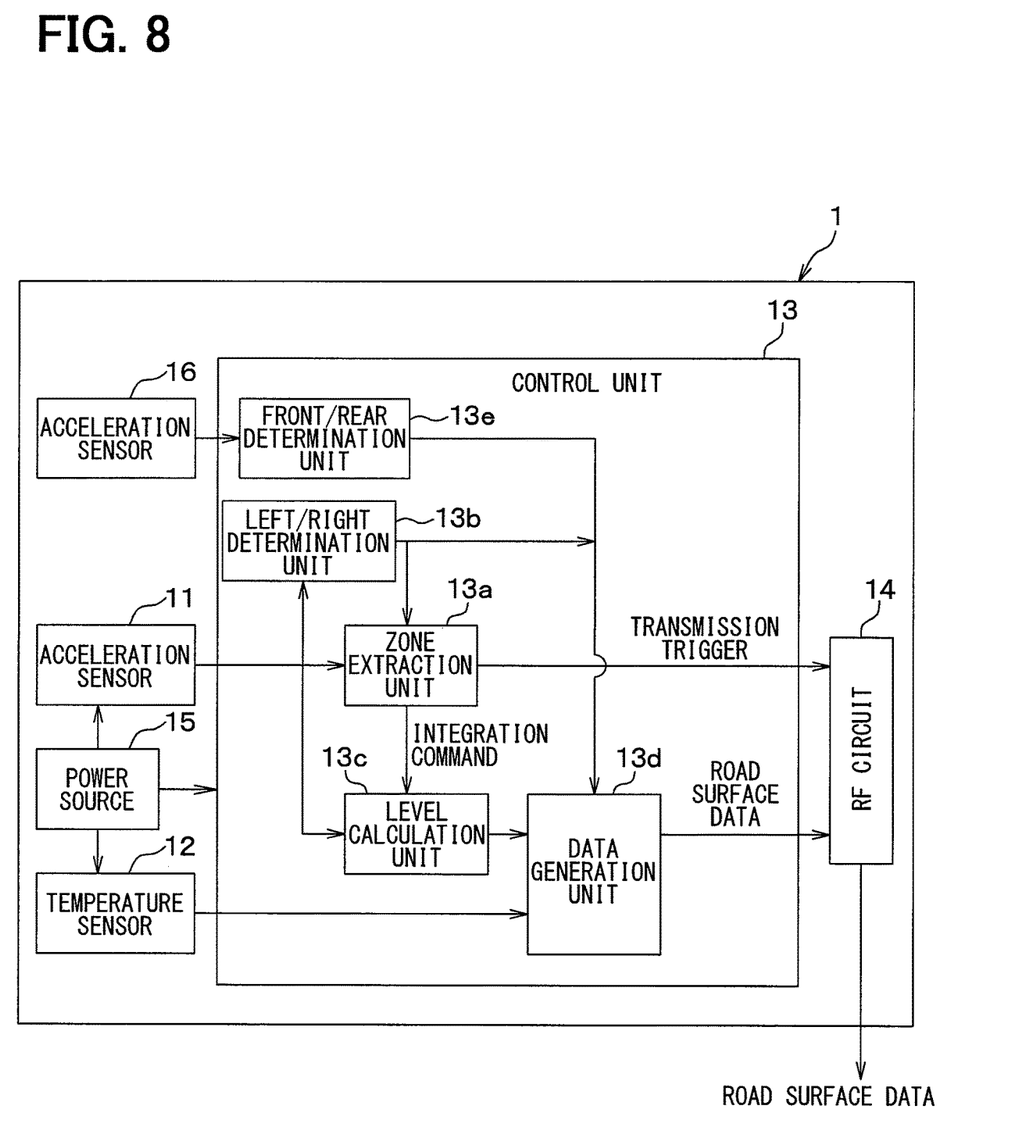
FIG. 8 is a block diagram of a tire-mounted sensor according to a second embodiment.

As shown in FIG. 8, in the present embodiment, an acceleration sensor 16 is provided in addition to the acceleration sensor 11 in the tire-mounted sensor 1 and a front/rear determination unit 13e is provided in the control unit 13.

The acceleration sensor 16 forms a steered wheel detection unit for detecting an acceleration component which is generated in the tire 3 in correspondence to steering. Specifically, assuming that a width direction of a tire, that is, a perpendicular direction to the sheet of FIG. 3 is a Y direction, the acceleration sensor 16 outputs a detection signal in accordance with acceleration in the Y direction. The acceleration component in the Y direction is generated in correspondence to the steering as will be described later.

Figure 9A:
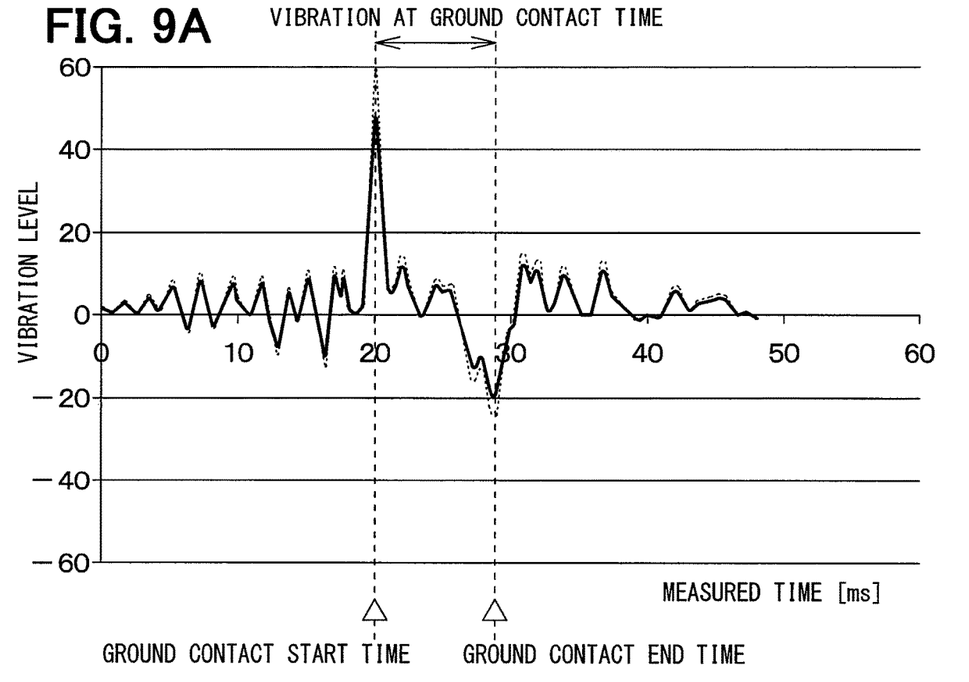
FIG. 9A is a chart showing an output voltage waveform of an acceleration sensor which detects an acceleration of a steered wheel in an X direction.
Figure 9B:
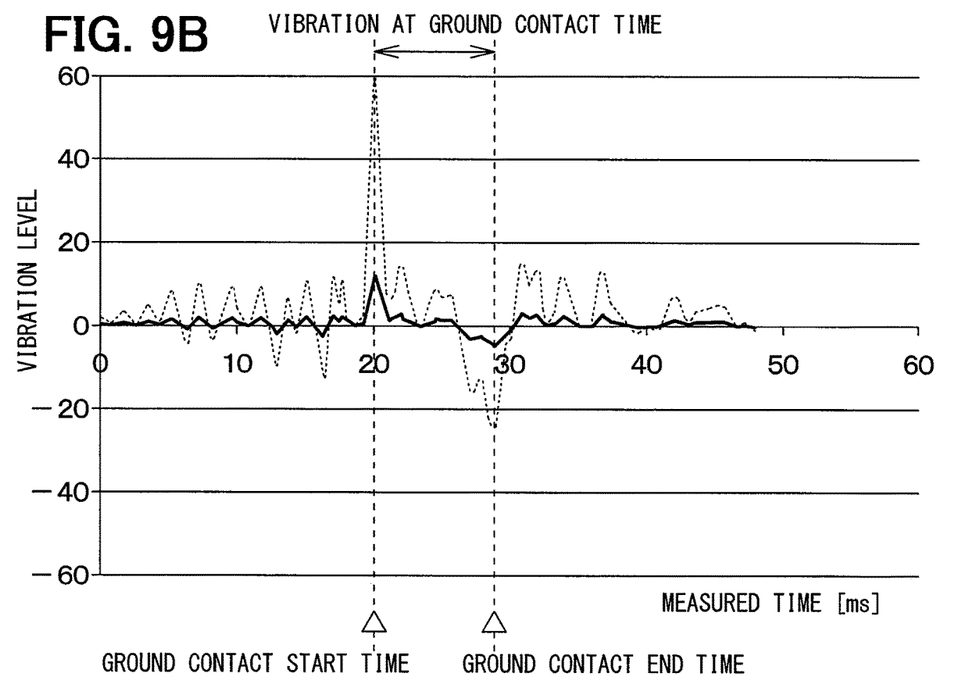
FIG. 9B is a chart showing an output voltage waveform of an acceleration sensor which detects an acceleration of a steered wheel in a Y direction.

As indicated with a solid line in FIG. 9A, at the time of steering, the component in the Y direction in the detection signal of the acceleration sensor 11 of the front wheel, that is, steered wheel, which detects the acceleration in the X direction, that is, tangential direction of the tire 3, decreases in correspondence to the steering. In addition, as indicated with a solid line in FIG. 9B, the acceleration component is generated in correspondence to the steering as the detection signal of the acceleration sensor 16, which detects the acceleration in the Y direction, that is, width direction of the tire 3. On the other hand, the detection signal of the rear wheel, which is a non-steered wheel, is not affected by the steering. As indicated by a dotted line in FIG. 9A for reference, the waveform does not change. The acceleration component in the Y direction corresponding to the steering is not generated in the detection signal of the acceleration sensor 16.

For this reason, with satisfaction of the determination start condition for the left/right determination described in the first embodiment, the front/rear determination unit 13e determines whether the acceleration component in the Y direction is generated in the detection signal of the acceleration sensor 16. In case that the acceleration component in the Y direction is generated, it is determined that the tire-mounted sensor 1 is attached to the front wheel. In case that the acceleration component in the Y direction is not generated, it is determined that the tire-mounted sensor 1 is attached to the rear wheel.

Figure 10:
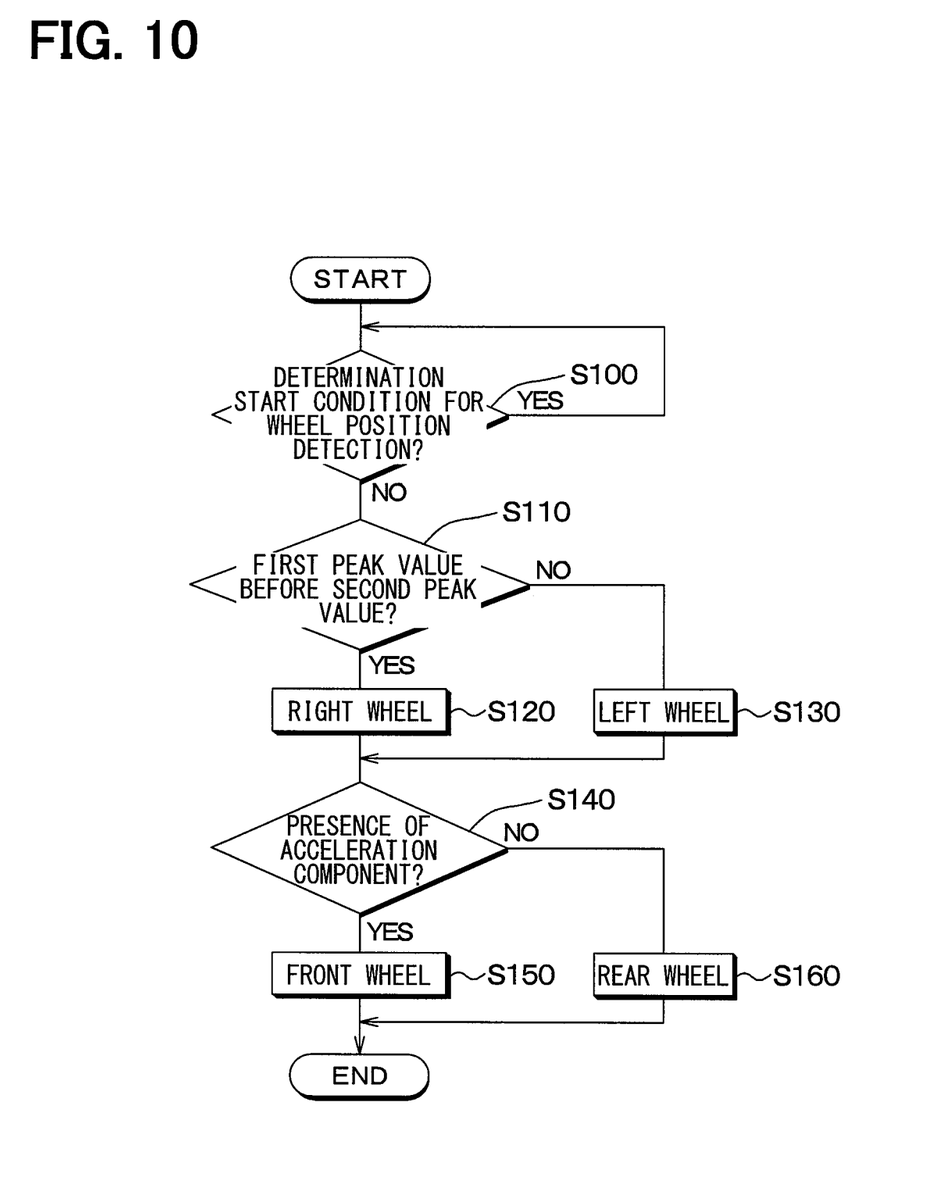
FIG. 10 is a flowchart showing whole processing executed systematically by the tire-mounted sensor according to the second embodiment.

FIG. 10 is a flowchart showing whole processing executed systematically by the tire-mounted sensor 1 according to the present embodiment. As shown in this figure, step S100 to step S130 execute similar processing as those of the first embodiment. It is determined at step S140 whether the acceleration component in the Y direction is generated in the detection signal of the acceleration sensor 16. In case that the acceleration component is generated, it is determined at step S150 that the tire-mounted sensor 1 is attached to the front wheel. In case that the acceleration component is not generated, it is determined at step S160 that the tire-mounted sensor 1 is attached to the rear wheel.

It is thus possible in the tire-mounted sensor 1 to execute both of the left/right determination and the front/rear determination and execute the wheel position detection which specifies to which one of the four wheels the tire-mounted sensor 1 is attached by only the tire-mounted sensor 1. In this case, as the wheel position data, the data indicating to which one of the four wheels the tire-mounted sensor 1 is attached is conveyed to the receiver 21. Thus it is possible to provide the same advantage as the first embodiment.

In some cases, no steering may be executed for a certain period after starting of the vehicle travel. It is therefore preferred to continue the wheel position detection for a predetermined period after starting of the vehicle travel. Further, the acceleration component is generated occasionally in the Y direction as noise. It is therefore preferred to determine that the tire-mounted sensor 1 is attached to the front wheel when the acceleration component is generated continuously in the Y direction.

Other Embodiment

The present disclosure made with reference to the embodiments described above is not limited to such embodiments but includes various variations and modifications in equivalent scopes. In addition, embodiments of various combinations as well as embodiments of other combinations, to which only one or more element or less element is added, are also included in the scope or technical concept of the present disclosure.

For example, as one example of front/rear determination methods, the receiver 21 is located at a position, which is distanced from the front wheel and the rear wheel by different lengths. However, other methods may be used.

Further, there is a different wheel position detection method, which is capable of specifying to which one of the four wheels the tire-mounted sensor 1 is attached. By using these methods jointly, it is possible to execute the wheel position detection in a short period. For example, a wheel position detection using a wheel speed sensor is usable. According to the front/rear determination using the wheel speed sensor, data transmission is executed from the tire-mounted sensor 1 every time when the rotation angle of the tire 3, that is, every time when an angle indicating the position of the tire-mounted sensor 1 on a circumference about a center of a wheel axle reaches a predetermined value. Further, a wheel tooth position of a toothed wheel rotatable with the wheel is acquired as toothed wheel information by the wheel speed sensor and the toothed wheel information of four wheels are stored each time the data is received from the tire-mounted sensor 1. As for the wheel to which the tire-mounted sensor 1 is attached, a variation in the tooth position indicated by the toothed wheel information is reduced. It is therefore possible to specify to which one of four wheels the tire-mounted sensor 1 is attached based on the variation.

In case that the wheel position is detected by using only the wheel speed sensor, the wheel position detection is not completed until the variation of the toothed wheel position arises to some extent. For this reason, in case that it is not yet possible to specify either one of the left wheel and the right wheel although it has already been possible to specify either one of the front wheel and the rear wheel based on the variation of the toothed wheel position, it is possible to execute the wheel position detection in a shorter period by combining with the left/right determination of the embodiment described above.

Further, in the second embodiment, it is determined to which one of the steered wheel and the non-steered wheel, that is, the front wheel and the rear wheel, the tire-mounted sensor 1 is attached, by detecting the acceleration component in the Y direction generated in correspondence to the steering based on the detection signal of the acceleration sensor 16. It is also possible to determine to which one of the steered wheel and the non-steered wheel the tire-mounted sensor 1 is attached based on both of the changes of the acceleration component in the X direction and the acceleration component in the Y direction, for example, by not solely depending on the acceleration component in the Y direction. That is, in case that the acceleration component in the X direction decreases and the acceleration component in the Y direction increases, it is so determined that the tire-mounted sensor 1 is attached to the front wheel which is the steered wheel. In case that the acceleration component in the X direction and the acceleration component in the Y direction do not change, it is so determined that the tire-mounted sensor 1 is attached to the rear wheel which is the non-steered wheel.

Further, in each of the embodiments described above, the left/right determination is executed by the tire-mounted sensor 1. It is alternatively possible to execute the left/right determination in the receiver 21 by conveying the vibration data which the tire-mounted sensor 1 receives from the acceleration sensor 11 to the receiver 21. Similarly, in the second embodiment described above, the front/rear determination is executed in the tire-mounted sensor 1. It is alternatively possible to execute the front/rear determination in the receiver 21 by conveying the acceleration data which the tire-mounted sensor 1 acquires from the acceleration sensor 16 to the receiver 21. In case of executing the left/right determination and the front/rear determination in the vehicle body side system 2, such determinations may be executed by any units in the vehicle body side system 2 although it is exemplarily executed as described in the first and second embodiments as well as the receiver 21 as described above. For example, since various ECUs such as the brake control ECU described above are provided in the vehicle body side system 2, the left/right determination and the front/rear determination may be executed by any one of the ECUs.

Further, it is so described in the embodiments described above that the output voltage of the acceleration sensor 11 generated in the ground contact zone has the first peak value prior to the second peak value in case that the tire-mounted sensor 1 is attached to the right wheel and the order is reversed in case that the tire-mounted sensor 1 is attached to the left wheel. However, since the output voltage of the acceleration sensor 11 is assumed to be positive in one of the X direction and negative in the other of the X direction, the polarities may be set oppositely. Therefore, the output voltage of the acceleration sensor 11 during the ground contact zone has the second peak value first and then the first peak value in case that the tire-mounted sensor 1 is attached to the right wheel. The order is reversed in case that the tire-mounted sensor 1 is attached to the left wheel.

What is claimed is:

1. A wheel position detecting device for a vehicle having four wheels to which tires are attached, a side surface of each tire facing an outer side of the vehicle being predetermined, the wheel position detecting device comprising:
    a tire-mounted sensor including
        a vibration detection unit provided in a back surface of the tire of each of the four wheels for outputting a detection signal corresponding to a magnitude of vibration in a tangential direction of the tire,
        a signal processing unit for executing a left/right determination thereby to determine, based on the detection signal of the vibration detection unit in one rotation of the tire, to which one of a right wheel and a left wheel the signal processing unit is attached, and generating wheel position data indicating a determination result of the left/right determination, and
        a transmitter for transmitting the wheel position data; and
    a vehicle body side system including a receiver for receiving the wheel position data transmitted from the transmitter and executing a wheel position detection for detecting, based on the wheel position data, to which one of the right wheel and the left wheel the tire-mounted sensor having transmitted the wheel position data is attached.

2. The wheel position detecting device according to claim 1, wherein:
    the tire-mounted sensor includes an acceleration sensor for detecting an acceleration component in a width direction of the tire;
    the signal processing unit executes a front/rear determination for determining, based on whether the acceleration component corresponding to steering is included in the detection signal of the acceleration sensor, that the tire-mounted sensor is attached to a steered wheel of a front wheel and a rear wheel in case that the acceleration component is included and that the tire-mounted sensor is attached to a non-steered wheel of the front wheel and the rear wheel in case that no acceleration component is included;
    the signal processing unit further generates, based on determination results of the left/right determination and the front/rear determination, the wheel position data indicating to which one of the four wheels the tire-mounted sensor is attached; and
    the vehicle body side system detects, based on the wheel position data, detects as the wheel position detection to which one of the four wheels the tire-mounted sensor having transmitted the wheel position data is attached.

3. The wheel position detecting device according to claim 1, wherein:
    the signal processing unit executes the left/right determination based on that a positive polarity and a negative polarity of peak values included in a high frequency component of the detection signal of the vibration detection unit becomes opposite between the left wheel and the right wheel at a ground contact start time and a ground contact end time of a part of tread of the tire, which corresponds to a location of arrangement of the vibration detection unit.

4. A wheel position detecting device for a vehicle having four wheels to which tires are attached, a side surface of the tire facing an outer side of the vehicle being predetermined, the wheel position detecting device comprising:
- a tire-mounted sensor including
  - a vibration detection unit provided in a back surface of the tire of each of the four wheels for outputting a detection signal corresponding to a magnitude of vibration in a tangential direction of the tire;
  - a signal processing unit for generating vibration data based on the detection signal of the vibration detection unit in one rotation of the tire; and
  - a transmitter for transmitting the vibration data; and
- a vehicle body side system including a receiver for receiving the vibration data transmitted from the transmitter and executing a wheel position detection by executing left/right determination for determining, based on the vibration data, to which one of the right wheel and the left wheel the tire-mounted sensor is attached.

5. The wheel position detecting device according to claim 4, wherein:
- the tire-mounted sensor includes an acceleration sensor for detecting an acceleration component in a width direction of the tire;
- the signal processing unit generates acceleration data indicated by the detection signal of the acceleration sensor;
- the transmitter transmits the acceleration data together with the vibration data;
- the vehicle body side system detects, as the wheel position detection in addition to the left/right determination executed based on the vibration data, to which one of the four wheels the tire-mounted sensor having transmitted the vibration data and the acceleration data is attached, by executing a front/rear determination based on whether the acceleration component corresponding to steering is included in the acceleration signal data, that the tire-mounted sensor is attached to a steered wheel of the front wheel and the rear wheel in case that the acceleration component is included and that the tire-mounted sensor is attached to a non-steered wheel of the front wheel and the rear wheel in case that no acceleration component is included.

6. The wheel position detecting device according to claim 4, wherein:
- the vehicle body side system executes the left/right determination based on that a positive polarity and a negative polarity of peak values included in a high frequency component of the detection signal of the vibration detection unit becomes opposite between the left wheel and the right wheel at a ground contact start time and a ground contact end time of a part of tread of the tire, which corresponds to a location of arrangement of the vibration detection unit.

\* \* \* \* \*